Patented May 17, 1938

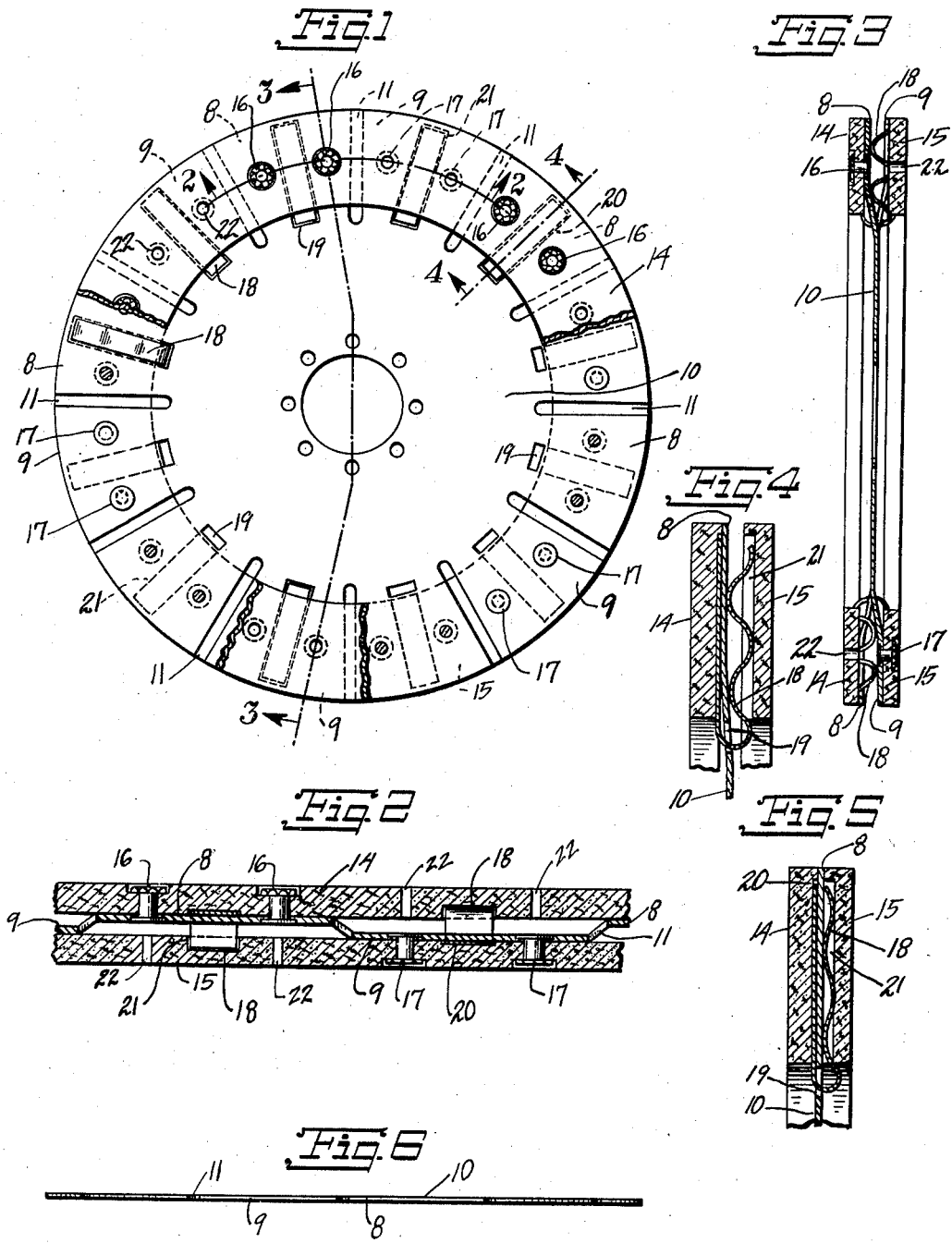

2,117,728

UNITED STATES PATENT OFFICE 2,117,728

DRIVEN MEMBER FOR FRICTION CLUTCHES

Morris Katcher, New York, N. Y.

Application December 24, 1937, Serial No. 181,479

10 Claims. (Cl. 192—107)

This invention relates to a driven member for friction clutches of the kind wherein the driven member is interposed between two parts of a driving member and is adapted to be gripped or clamped by the parts under sufficient pressure to impart motion from the driving member to the driven member. The invention is particularly desirable in a friction clutch for automobiles.

An object of this invention is to provide means which shall be sufficiently yieldable to effect gradually the friction grip between the parts of the driving member and the friction facings of the driven member. This is effected by mounting the friction facings on the plate of the driven member with springs behind the facings. The plate or disc is further constructed with spokes or sectors which normally are in axial alignment with each other before the disc has the friction facings and springs mounted on it. When the springs and facings are mounted on the disc, the spokes are, against their resiliency, alternately held out of axial alignment with each other, alternate spokes being in substantially axial alignment with each other. Each facing is fastened to alternate spokes only.

In the discs of my Patent No. 2,093,243, Sept. 14, 1937 and Patent No. 2,096,587, Oct. 19, 1937, alternate spokes are offset axially from each other, the discs being so formed, however, that the spokes are in such positions without being stressed when the driven member is not gripped between the two parts of the driving member. In other words, the disc has two sets of spokes, the spokes of a set being in axial alignment with each other but normally out of axial alignment with the spokes of the other set. A friction facing is fastened to each set, the facing fastened to one set being unattached to the other set, and springs are located between the facings and the spokes. When the driven member, thus constructed, is gripped between the two parts of a driving member, the spokes become flattened out to a great extent against their resilience, effecting the gradual taking hold noted above. It has been found in practice that, with the disc made of mild steel, this flattening out afterwards becomes permanent so that the resilient action of the spokes is lost, and the facings become bumpy under the action of the springs. Mild steel is the only practical steel to use, because stiff steel is too brittle.

On the other hand, with the spokes normally held out of axial alignment against their resilience by the springs, as in the present invention, the flattening effect of the grip between the two parts of the driving member cannot produce a permanent flattening of the spokes. The springs will always push them back out of line.

It is a further object of my invention to construct the disc with spokes whose resilience is small compared to that of the springs used behind the facings. The stiffness of the facings, between their attachment to alternate spokes is also substantially greater than that of the spokes.

Another object of my invention is to increase the effective surface of the friction facings by reducing the size of the holes in them. In my above mentioned patents, the holes in one facing were made large enough to accommodate the rivet heads for rivets used to attach the other facing. In my present invention the rivet heads do not enter the small holes provided but only come opposite them.

Other objects and advantages will become apparent upon a further study of the description and drawing, in which:—

Fig. 1 is an elevation of one side of the friction clutch member with some of the springs and portions of the friction facings omitted.

Fig. 2 is a fragmental section, to an enlarged scale, taken along the line 2—2 of Fig. 1.

Fig. 3 is a section taken along the line 3—3 of Fig. 1.

Fig. 4 is a fragmental section, to an enlarged scale, taken along the line 4—4 of Fig. 1.

Fig. 5 is a fragmental section, to an enlarged scale, taken similarly to Fig. 4, except that it shows the parts as they appear when squeezed between the parts of the driving member, and Fig. 6 shows the clutch plate or disc by itself as it appears when separated from the other parts of the driven member.

The friction member comprises a plate or disc 10, having slots 11 therein which give rise to spokes 8 and 9. Spokes 8 alternate with spokes 9. Friction facing 14 is fastened to the top (as in Fig. 2) of spokes 8 by means of rivets 16, while friction facing 15 is fastened to the bottom or outer face of spokes 9 by means of rivets 17. The facings are fastened to their corresponding spokes by two rivets at each spoke. The set of spokes 8 is held away from friction facing 15 by the wavy legs of hair-pin springs 18. Similarly the set of spokes 9 is held away from friction facing 14, by the wavy legs of other hair-pin springs 18. Each spring 18 is held in position on plate 10 by having its head pass through oblong openings 19 in said plate. One leg of spring 18 is flat, while its other leg is substantially wavy shaped. Springs 18 are so placed in openings 19, that the flat leg of each spring is either on the upper face of a spoke 8 (Fig. 2) or on the lower face of spoke 9. This results in having the flat legs of successive springs alternately on top and on bottom of plate 10. Friction facings 14 and 15 are provided with recesses 20 on their inside to accommodate the flat legs of springs 18. Said facings are also provided on their inside with deeper recesses 21 alternating with recesses 20, to accommodate the wavy legs of said springs.

Before having friction facings 14 and 15 and springs 18 mounted in position upon it, plate 10 with its sets of spokes 8 and 9 is substantially flat, as shown in Fig. 6, the sets of spokes lying in the same general plane. However, in mounting the above mentioned parts upon plate 10, spokes 8 are bent or forced up (Fig. 2) against their resilience, while spokes 9 are forced down. Spokes 8 preferably alternate with spokes 9. The stiffness of facing 14, between where it is fastened to successive spokes 8 by rivets 16, is very much greater than the stiffness of a spoke 9, so that when the wavy leg of a spring 18, which is also stiffer than spoke 9, is interposed between the inside face of facing 14 and a spoke 9, said latter spoke is bent down out of the plane of plate 10. Similarly, the stiffness of facing 15 between its points of support at rivets 17 on successive spokes 9, and the stiffness of the wavy legs of springs 18 are greater than the stiffness of spokes 8, resulting in the latter spokes being bent up against their resilience out of the plane of plate 10. All of spokes 8 being equally forced up and all of spokes 9 being equally forced down, out of the plane of plate 10, results in holding facings 14 and 15 normally in parallel spaced relation to each other on opposite sides of the general plane of plate 10.

Now, when said facings are squeezed between the two parts of the driving member, the sets of spokes 8 and 9 are forced back against the resilience of the wavy legs of springs 18 into the general plane of plate 10, Fig. 5. The resilience of spokes 8 and 9 acts to help the squeezing action to return them to the same general plane.

To avoid brittleness, plate 10 with its spokes 8 and 9 is made of mild steel. Yet the driven member will always have its facings 14 and 15 resiliently held apart by spring steel springs 18 when said driven member is not squeezed. On the other hand with the construction of plate 10 and its spokes as noted in my prior patents mentioned above, this resilience is lost to a great extent. Here the spokes are offset to begin with. They are normally out of the plane of plate 10, even before the plate has the facings and springs assembled upon it. The resilience of the spokes are to a large extent depended upon to keep the facings apart. If under these conditions, stiff steel is used for the plate and spokes, the latter will break under repeated squeezings which flatten them against their resilience. If the plate and spokes are made of mild steel, the repeated flattenings will ultimately permanently flatten the spokes, losing a great part of the resiliency of the driven member and allowing the springs only to act. Where springs only act, the facings become bumpy and quickly wear under the squeezing and gripping action of the driving member. With my present invention, the facings will present an even surface to the driving parts because the spokes do not lose their function.

Two factors can be used to keep down the stiffness of the spokes in my mild steel plate 10. One is to keep down their thickness and the other is to use more of them, having them of relatively narrow width.

Recesses 21, on the inside of facings 14 and 15, to accommodate the wavy shaped legs of springs 18, are of sufficient depth to contain said legs when they receive their maximum flattening. Their maximum flattening is obtained when spokes 8 and 9 are squeezed back into the same general plane, Fig. 5.

The term "hair-pin" is applied to the springs with the understanding that the legs of the springs have substantial width. Other types of springs than those shown are suitable, so long as they hold back the spokes from the inside of the facings.

Rivets 16 and 17 have their heads counter-sunk in spokes 8 and 9. Said rivets are inserted in alternate direction, on successive spokes, before they are used for fastening facings 14 and 15. Said facings are then set over the shanks of the rivets before their other heads are formed. Small holes 22 are provided in the facings for the insertion therethrough of a bucking up tool against the counter-sunk head of the rivet while the opposite head is being upset from the shank. Where facings 14 and 15 are not fastened at the same time to their spokes but one facing, say facing 14 is put on first, holes 22 in only one facing are necessary. In the example given, holes 22 are required only in facing 14, means for bucking up the countersunk heads of rivets 16 not being required to pass through facing 15, as the latter is not put on till afterwards, when holes 22 in facing 14 are used to buck up the countersunk heads of rivets 17.

By the use of small holes very little of the area of the facing is lost for its friction grip. In my previous patents large holes were provided in the friction facings to accommodate the rivet heads.

In my present invention, while it is preferred to countersink the rivet heads at the inside of the facings to allow the friction rings or facings to lie flat on the spokes when the rings are squeezed between the parts of the driving member, it is within the scope of my invention to use holes 22 and the usual projecting rivet heads, provided the inside of the facing is recessed to accommodate the rivet heads.

I claim:—

1. A clutch plate having a plurality of peripheral spokes, friction rings arranged on opposite sides of said spokes and connected to alternate spokes, and springs at the spokes behind the facings for normally holding back the spokes, against their resiliency, from the facings to which they are unattached.

2. A clutch plate having a plurality of peripheral spokes, said spokes lying in the same general plane when unstressed, friction rings arranged on opposite sides of said plate and connected to alternate spokes, and springs at the spokes behind the facings, each spring being held under compression between a facing and a spoke to which said facing is unattached, the relative stiffness of the spring, spoke and facing being such that the spoke is held against its resilience a substantial distance axially out of said plane in a direction away from the facing to which it is unattached.

3. A driven member for friction clutches comprising a disc having two sets of spokes, the spokes of a set tending normally to be in substantially axial alignment with each other and with the spokes of the other set, friction facings arranged on opposite sides of the spokes, a friction facing fastened to each set, the facing fastened to one set being unattached to the other set, and springs behind each facing at the spokes of the set to which it is unattached, said springs forcing back the spokes of each set against their resilience from the facings to which they are unattached for holding the facings a substantial axial distance from each other.

4. A driven member for friction clutches comprising a disc having two sets of spokes, the spokes of a set tending normally to lie in the same general plane with the spokes of the other set, friction facings arranged on opposite sides of the spokes, a friction facing fastened to each set, the facing fastened to one set being unattached to the other set, and springs behind each facing at the spokes of the set to which it is unattached, said springs forcing back the spokes, against their resilience, axially out of said plane, the spokes of one set being forced in the opposite direction from the spokes of the other set, holding the inner faces of said facings on opposite sides of said plane.

5. A clutch plate having two sets of spokes, a friction facing fastened to one side of one set, another friction facing fastened to the opposite side of the other set, the facing fastened to one set being unattached to the other set, the spokes of one set alternating with the spokes of the other set, and springs behind each facing at the spokes of the set to which it is unattached, said springs forcing back the spokes of each set against their resilience from the facings to which they are unattached, to hold the facings with their inner faces a greater distance apart axially than the thickness of the spokes, the outer faces of said facings being held substantially parallel to each other.

6. A clutch plate having two sets of spokes, the spokes of one set being interspersed between the spokes of the other set, friction facings arranged on opposite sides of the spokes, a friction facing fastened to each set, the facing fastened to one set being unattached to the other set, and springs at the spokes between the spokes and the inside of the facings, said springs bending back the spokes against their resilience from the facings to which they are unattached, the stiffness of the spokes being very much less than that of a facing between successive spokes of the set to which it is attached, said springs also being of substantially greater stiffness than the spokes.

7. A clutch plate having two sets of spokes, said spokes when unstressed lying substantially in the same general plane, a friction facing fastened to each set, the facing fastened to one set being unattached to the other, and hair-pin springs having their legs located between the facings and the spokes, one leg of each spring being bowed, said bowed leg being between a spoke and the facing to which it is unattached and forcing back said spoke against its resilience from said latter facing.

8. A driven member for friction clutches adapted to be squeezed between the parts of a driving member, said driven member having two sets of spokes, said spokes when unstressed lying substantially in the same general plane, a friction facing fastened to each set, the facing fastened to one set being unattached to the other, and springs at the spokes between the spokes and the inside of the facings, said springs bending back the spokes against their resilience from the facings to which they are unattached, said facings being recessed on their inside to accommodate said springs when the spokes are flattened out upon the squeezing together of said facings by the parts of the driven member.

9. A driven member for friction clutches comprising a disc having two sets of peripheral spokes, friction rings arranged on opposite sides of said spokes, and rivets fastening a ring to each set, the ring riveted to one set being unattached to the other set, at least one ring being provided with an opening opposite each rivet fastening the other ring, the size of each opening being less than the size of the rivet head of the rivet opposite to which it comes, said holes permitting the insertion of a bucking up tool against the rivets when the latter are driven.

10. A driven member for friction clutches adapted to be squeezed between the parts of a driving member, said driven member having two sets of peripheral spokes, friction rings arranged on opposite sides of said spokes, and rivets fastening a ring to the spokes of each set, the ring riveted to the spokes of one set being unattached to the spokes of the other set, at least one ring being provided with an opening opposite each rivet fastening the other ring, the size of each opening being less than the size of the rivet head of the rivet opposite to which it comes, the rivet heads on the inside of the facings being countersunk in their spokes, whereby when the rings are squeezed between the parts of the driving member they may lie flat on the spokes opposite to which they come at the rivet heads, said holes permitting the insertion of a bucking up tool against the rivets when the latter are driven.

MORRIS KATCHER.